March 23, 1926.
L. S. CHRISTOPHERSON
BEARING CAGE
Filed Sept. 27, 1924
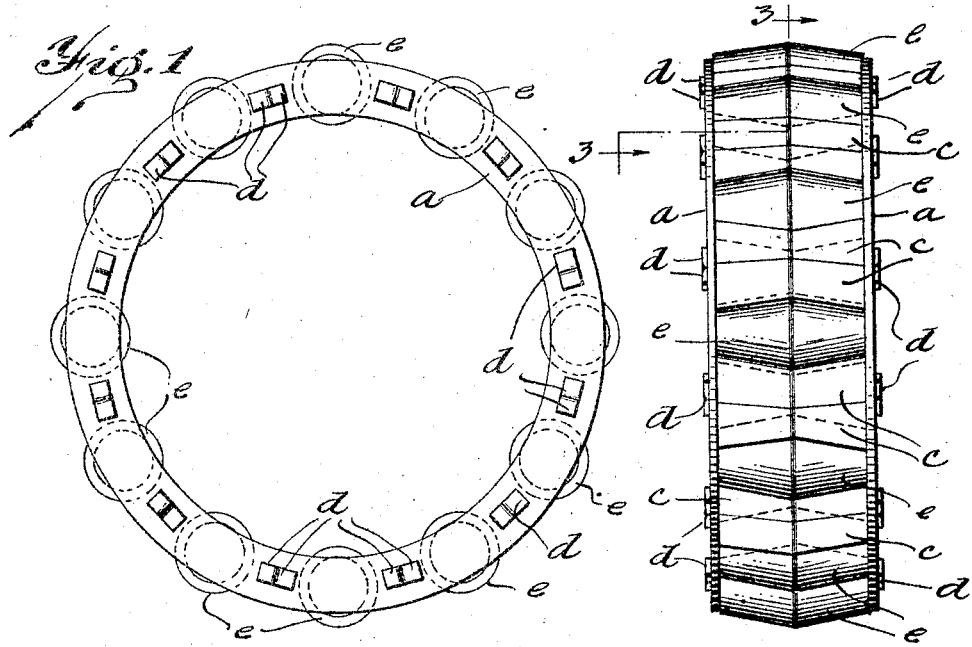
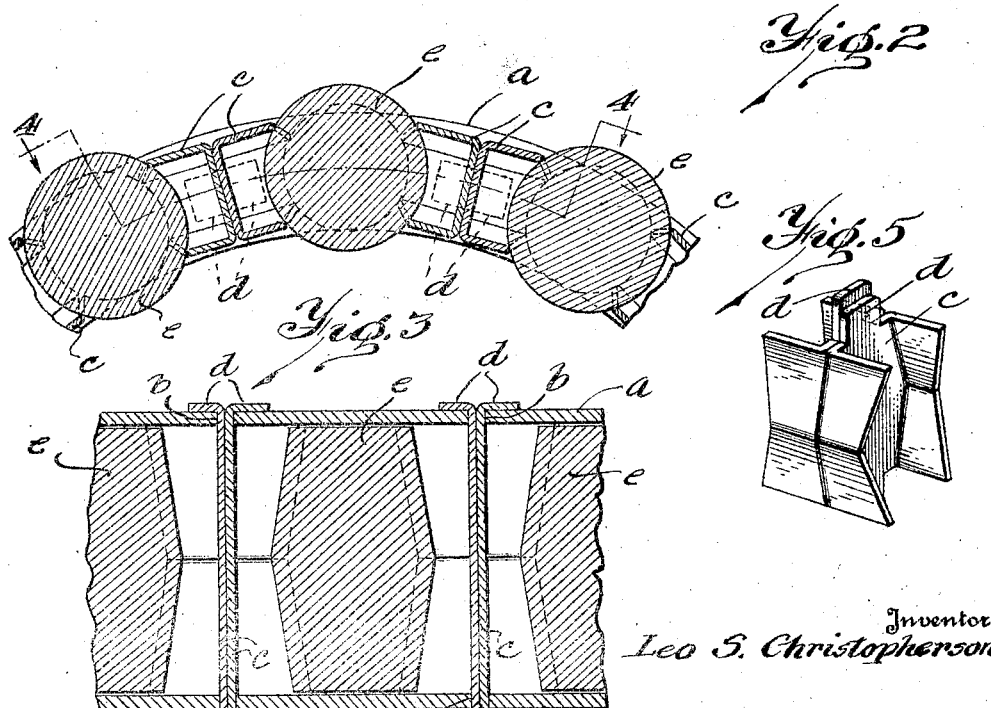
Inventor
Leo S. Christopherson Patented Mar. 23, 1926.

1,577,787

UNITED STATES PATENT OFFICE.

LEO S. CHRISTOPHERSON, OF SPOKANE, WASHINGTON, ASSIGNOR TO CHRIS DOUBLE TAPER BEARING CO., OF SPOKANE, WASHINGTON, A CORPORATION OF WASHINGTON.

BEARING CAGE.

Application filed September 27, 1924. Serial No. 740,215.

*To all whom it may concern:*

Be it known that I, LEO S. CHRISTOPHERSON, a citizen of the United States, residing at Spokane, in the county of Spokane and State of Washington, have invented certain new and useful Improvements in Bearing Cages, of which the following is a specification.

This invention relates to a bearing cage and more particularly one for supporting a plurality of two-tapered roller bearings, though obviously rollers of a single taper or straight rollers with no taper could be supported in the same way with a slight change in design, without departing from the spirit of the invention.

This invention has for its object the provision of a bearing cage which may be constructed of metal stampings which are suitably stamped and formed by dies with one operation of a punch press. In addition, the parts which go to make up the bearing cage may be easily and quickly assembled together, thereby materially reducing the production costs. It is quite essential in the manufacture of bearing cages to provide means whereby the bearings, which are used in large quantities, can be produced for a very low cost.

One of the features of this invention is that the housing parts which house the roller elements are uniform in shape and may be produced in large quantities with a minimum of cost.

A further object is the assembly of my roller housings to the supporting or side rings, thereby allowing each roller to be separately supported on the side rings so that when any roller becomes worn it may be replaced with a new one without disturbing the entire assembly.

In the drawings:

Fig. 1 is a side elevation of a bearing cage constructed in accordance with my invention.

Fig. 2 is an edge elevation of the same.

Fig. 3 is an enlarged vertical section through my cage taken substantially on the line 3—3 of Fig. 2.

Fig. 4 is a sectional view taken on the line 4—4 of Fig. 3.

Fig. 5 is a perspective detail of the housing parts showing how the same may be positioned back to back.

My bearing cage comprises a pair of side rings *a* provided with a plurality of perforations *b*. *c* designates the housing parts which are uniform in shape and are provided with the tongues *d* which are adapted to be inserted through the perforations *b* in the side rings and bent over as shown in Fig. 4, to secure the housing parts to the side rings. These housing parts are substantially U-shaped in cross section, and are arranged in the assembly back to back so that a pair of tongues, one carried by each housing part, may be inserted through one of the perforations *b* in the side rings, the said tongues being bent over in opposite directions for securing the housing parts to the side rings.

These housing parts, which are secured to the side rings back to back in pairs, are spaced apart about the circumference of the side rings as clearly shown in Fig. 3. The U-shaped channel housings open away from each other and provide a space therebetween wherein the roller elements *e* are fitted. From an observation of Fig. 3, it will be noticed that the housing parts so engage the roller as to secure the same in place and allow a portion of the roller to project from the housing, thereby allowing the rollers to engage bearing surfaces (not shown).

I have here shown two-tapered rollers, but obviously this invention is applicable to other forms of rollers. When using two-tapered rollers the side walls of the U-shaped housing parts are formed with a double taper or inclined at an angle to each other substantially as shown, so as to conform with the taper of the rollers. In addition, the outer edge of the side wall is cut substantially V-shaped, thereby allowing the housing parts to accurately fit the two-tapered rollers. This will allow the roller to project uniformly out of the housing. Obviously these housing parts could be cut or formed in any shape to conform with the special shape or contour of the rollers, which are to be used in the bearing cage.

An advantage of this construction is that the complete roller housing is formed of two parts which are identical, and which are adapted to engage opposite sides of the roller and allow the roller to project from both sides of the said housing and beyond the side rings *a*. These housing parts are each independently and separately secured to the side rings which allows the efficient removal of any one of the rollers and its housing for the purpose of repairing the same or replacing with a new bearing element. In addition, this securing means permits one to omit any roller and its housing if it is desirable to use a lesser number of roller elements. Obviously, every alternate roller could be omitted without disturbing the assembly of the completed bearing.

I have provided these housing parts each with one short tongue and one long tongue, so that when assembling the same to the side rings they can be matched up as shown in Fig. 5, thereby allowing one short and one long tongue to be inserted through each perforation $d$. This permits the tongues to be more readily bent over as the long tongue may be readily grasped by a tool and bent over first, which leaves the short tongue free to be grasped by the tool and bent over in the opposite direction.

What I claim is:

1. In a bearing cage, the combination of a pair of side rings, roller elements, two-part roller housings each part spaced apart and each part separately secured to the side rings for separately supporting a roller element therebetween, which permits the removal of any two-part housing and roller supported therein independently of the other housings.

2. In a bearing cage, the combination of a pair of side rings, roller elements, and two-part roller housings each part consisting of a U-shaped channel section, the said housing parts spaced apart to allow a roller element to be fitted therebetween, said housing parts being each separately and removably secured to the side rings to complete the assembly, which permits any housing and roller supported thereby to be removed without disturbing the remaining rollers.

3. In a bearing cage, the combination of a pair of side rings provided with a plurality of perforations therethrough, roller elements, and two-part roller housings provided with tongues on each part and arranged to support a roller element therebetween, the tongues carried by said housing parts passed through the perforations in said side rings and bent over to separately and removably secure each housing to said side rings, which permits the removal of any housing and roller supported thereby without disturbing the other rollers.

4. In a bearing cage, the combination of a pair of side rings, two-tapered roller elements and two-part roller housings, each housing part comprising a U-shaped channel portion, said channels opening towards each other and spaced apart for supporting a roller therebetween, the edges of said housing parts which engage said roller having a contour conforming to the taper of the roller, and means for separately securing each housing part to said side rings for providing an independent housing for each roller.

5. In a bearing cage, the combination of a pair of side rings, roller elements, two-part roller housings each housing part substantially U-shaped in cross section, and means for separately securing said housing parts in pairs back to back to said side rings and positioned at spaced intervals about the circumference of the side rings, the housing part of one pair and the adjacent part of the adjacent pair forming a complete roller housing for separately and independently supporting a roller element.

In testimony whereof I have affixed my signature.

LEO S. CHRISTOPHERSON.